(12) United States Patent
Agiwal

(10) Patent No.: US 12,457,544 B2
(45) Date of Patent: Oct. 28, 2025

(54) METHOD AND APPARATUS FOR CELL BARRING IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 18/528,005

(22) Filed: Dec. 4, 2023

(65) Prior Publication Data

US 2024/0121700 A1  Apr. 11, 2024

Related U.S. Application Data

(63) Continuation of application No. 17/827,160, filed on May 27, 2022, now Pat. No. 11,838,852, which is a continuation of application No. 17/164,022, filed on Feb. 1, 2021, now Pat. No. 11,350,344, which is a continuation of application No. 16/774,391, filed on Jan. 28, 2020, now Pat. No. 10,912,010.

(60) Provisional application No. 62/797,662, filed on Jan. 28, 2019.

(51) Int. Cl.
*H04W 4/00* (2018.01)
*H04W 48/02* (2009.01)
*H04W 48/08* (2009.01)

(52) U.S. Cl.
CPC ........... *H04W 48/02* (2013.01); *H04W 48/08* (2013.01)

(58) Field of Classification Search
CPC ..... H04W 48/02; H04W 48/08; H04W 48/12; H04W 88/02
USPC ........................................... 455/434; 370/338
See application file for complete search history.

(56) References Cited

U.S. PATENT DOCUMENTS

| | | |
|---|---|---|
| 8,498,664 B2 | 7/2013 | Kim et al. |
| 2013/0288694 A1 | 10/2013 | Mochizuki et al. |
| 2014/0086173 A1 | 3/2014 | Sadeghi et al. |
| 2017/0164261 A1 | 6/2017 | Somasundaram et al. |
| 2018/0132168 A1 | 5/2018 | Abhimanyu et al. |
| 2021/0153245 A1* | 5/2021 | Tooher .............. H04W 72/0453 |

OTHER PUBLICATIONS

LTE; Evolved Universal Terrestrial Radio Access (E-UTRA); User Equipment (UE) procedures in idle mode (3GPP TS 36.304 version 15.1.0 Release 15)' ETSI TS 136 304 V15.1.0, Sep. 27, 2018.
Gemalto N.V., 'Cell re-selection considerations', R2-1816425, 3GPP TSG-RAN WG2 Meeting #104, Nov. 1, 2018.

(Continued)

*Primary Examiner* — Marcos Batista
(74) *Attorney, Agent, or Firm* — Jefferson IP Law, LLP

(57) ABSTRACT

A method and apparatus for cell barring in a wireless communication system are provided. The method includes determining whether system information block type 1 (SIB1) is acquired from a cell, considering the cell as barred, if the acquiring the SIB1 fails, determining whether the cell is a licensed cell or an unlicensed cell and excluding the cell and other cells on a same frequency with the cell as a candidate for cell selection or reselection for a pre-defined period, if the cell is a licensed cell and cell selection or reselection to intra-frequency cells is not allowed.

10 Claims, 15 Drawing Sheets

(56) References Cited

OTHER PUBLICATIONS

Samsung, 'Clarification of UE behavior for barred cell', R2-1817004, 3GPP TS G-RAN2 104, Nov. 2, 2018.
International Search Report dated May 8, 2020, issued in International Application No. PCT/KR2020/001295.
Labib et al., "Enhancing the Robustness of LTE Systems: Analysis and Evolution of the Cell Selection Process," IEEE Communications Magazine, pp. 208-215, Feb. 2017.
Samsung Inc., "Cell Barring in NR-U," 3GPP TSG-RAN2 107, R2-1908803, Prague, Czech Republic, Aug, 26-30, 2019.
European Search Report dated Feb. 7, 2022, issued in European Application No. 20748651.5.
Indian Office Action dated Dec. 29, 2022, issued in an Indian Application No. 202137034844.
Korean Office Action dated Jun. 29, 2025, issued in Korean Patent Application No. 10-2021-7023557.
European Notice of Allowance dated Jun. 2, 2025, issued in European Patent Application No. 20748651.5.

* cited by examiner

METHOD AND APPARATUS FOR CELL BARRING IN WIRELESS COMMUNICATION SYSTEM

CROSS-REFERENCE TO RELATED APPLICATION(S)

This application is a continuation application of prior application Ser. No. 17/827,160 filed on May 27, 2022, which has issued as U.S. Pat. No. 11,838,852 on Dec. 5, 2023; which is a continuation application of prior application Ser. No. 17/164,022 filed on Feb. 1, 2021, which issued as U.S. Pat. No. 11,350,344 on May 31, 2022; which is a continuation application of prior application Ser. No. 16/774,391 filed on Jan. 28, 2020, which issued as U.S. Pat. No. 10,912,010 on Feb. 2, 2021; and which is based on and claims priority under 35 U.S.C. § 119(e) of a U.S. Provisional application Ser. No. 62/797,662 filed on Jan. 28, 2019 in the U.S. Patent and Trademark Office, the entire disclosure of which is incorporated by reference herein in its entirety.

BACKGROUND

1. Field

The disclosure relates to a method and apparatus for cell barring in a wireless communication system.

2. Description of Related Art

To meet the soaring demand with respect to wireless data traffic because the commercialization of $4^{th}$-generation (4G) communication systems, efforts have been made to develop improved $5^{th}$-generation (5G) communication systems or pre-5G communication systems. For this reason, 5G communication systems or pre-5G communication systems are also referred to as a beyond-4G-network communication systems or a post-long term evolution (LTE) systems. The 5G communication system prescribed in the $3^{rd}$ Generation Partnership Project (3GPP) is called a new radio (NR) system. For higher data transmission rates, the implementation of 5G communication systems on ultra-high frequency bands millimeter wave (mmWave), e.g., 60 GHz, is being considered. In 5G communication systems, beamforming, massive multi-input multi-output (MIMO), full dimensional MIMO (FD-MIMO), an array antenna, analog beamforming, and large-scale antenna technologies have been discussed as ways of alleviating propagation path loss and increasing propagation distances in ultra-high frequency bands, and have also been applied to NR systems. For system network improvement, in 5G communication systems, technologies such as evolved small cell, advanced small cell, cloud Radio Access Network (RAN), ultra-dense network, Device to Device (D2D) communication, wireless backhaul, moving network, cooperative communication, Coordinated Multi-Points (CoMPs), and interference cancellation have been developed. In a 5G system, Advanced Coding Modulation (ACM) schemes including hybrid Frequency-Shift Keying (FSK) and Quadrature Amplitude Modulation (QAM) Frequency and Quadrature Amplitude Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The Internet, which is a human-oriented connectivity network where humans generate and consume information, is now evolving into the Internet of Things (IoT), where distributed entities, such as objects, exchange and process information. The Internet of Everything (IoE) has also emerged, which is a combination of IoT technology and Big Data processing technology through connection with a cloud server, etc. In order to implement IoT, technological elements, such as sensing technology, wired/wireless communication and network infrastructure, service interface technology, and security technology, are required, and in this regard, technologies such as sensor networks, machine to machine (M2M), machine-type communication (MTC), and so forth have recently been researched for connection between things. Such an IoT environment may provide intelligent Internet technology (IT) services that create new value to human life by collecting and analyzing data generated among connected things. IoT may be applied to a variety of fields including smart homes, smart buildings, smart cities, smart cars or connected cars, smart grids, health care, smart appliances, advanced medical services, and so forth through convergence and combination between existing information technology (IT) and various industries.

Thus, various attempts have been made to apply 5G communication systems to IoT networks. For example, 5G communication, such as sensor networks, M2M, MTC, etc., has been implemented by a scheme such as beamforming, MIMO, an array antenna, and so forth. The application of cloud RAN as a Big Data processing technology may also be an example of the convergence of 5G technology and IoT technology.

As described above, various services may be provided as mobile communication systems develop, and accordingly, enhanced cell barring is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments of the disclosure.

In accordance with an aspect of the disclosure, a method for cell barring performed by a User Equipment (UE) in a wireless communication system is provided. The method includes determining whether system information block type 1 (SIB1) is acquired from a cell, considering the cell as barred if the acquiring of the SIB1 fails, determining whether the cell is a licensed cell or an unlicensed cell and excluding the cell and other cells on a same frequency as the cell as a candidate for cell selection or reselection for a pre-defined period if the cell is a licensed cell and cell selection or reselection to intra-frequency cells is not allowed.

The method further includes considering the other cells as candidates for cell selection or reselection for the pre-defined period, if the cell is a licensed cell and cell selection or reselection to intra-frequency cells is allowed.

The method further includes excluding the cell as a candidate for cell selection or reselection for the pre-defined period, if the cell is an unlicensed cell.

The method further includes excluding the other cells as candidates for cell selection or reselection for the pre-defined period, if cell selection or reselection to intra-frequency cells is not allowed and the cell belongs to a public land mobile network (PLMN) equivalent to a registered PLMN.

The determining of whether the SIB1 is acquired includes determining whether the SIB1 is received while a timer for cell selection or reselection is running in an idle mode, an inactive mode or a connected mode.

The method further includes acquiring master information block (MIB) from the cell wherein a parameter intraFreqReselection included in the MIB indicates whether cell selection or reselection to intra-frequency cells is allowed.

In accordance with another aspect of the disclosure, a method for cell barring performed by a User Equipment (UE) in a wireless communication system is provided. The method includes determining whether a barred cell is a licensed cell or an unlicensed cell, determining whether the barred cell belongs to a PLMN equivalent to a registered PLMN and excluding cells on a same frequency as the barred cell as candidates for cell selection or reselection for a pre-defined period, if cell selection or reselection to intra-frequency cells is not allowed, the barred cell is an unlicensed cell and the barred cell belongs to a PLMN equivalent to a registered PLMN.

The method further includes excluding the barred cell as a candidate for cell selection or reselection for the pre-defined period, if cell selection or reselection to intra-frequency cells is not allowed, the barred cell is unlicensed cell and the barred cell does not belong to the PLMN equivalent to the registered PLMN.

The method further includes excluding the cells on the same frequency as the cell as a candidate for cell selection or reselection for the pre-defined period, if cell selection or reselection to intra-frequency cells is not allowed and the barred cell is licensed cell.

The method further includes acquiring, master information block (MIB) from the barred cell, wherein a parameter intraFreqReselection included in the MIB indicates whether cell selection or reselection to intra-frequency cells is allowed, and parameter cellBarred included in the MIB indicates barring of the barred cell.

The method further includes determining whether the cell belongs to the PLMN equivalent to the registered PLMN by acquiring system information block type 1 (SIB1) of the cell.

In accordance with another aspect of the disclosure, a user equipment (UE) in a wireless communication system is provided. The UE includes a transceiver, at least one memory storing instructions for cell barring, and at least one processor configured to execute the instructions to determine whether system information block type 1 (SIB1) is acquired from a cell, consider the cell as barred if the acquiring of the SIB1 fails, determine whether the cell is a licensed cell or an unlicensed cell and exclude the cell and other cells on a same frequency as the cell as a candidate for cell selection or reselection for a pre-defined period, if the cell is a licensed cell and cell selection or reselection to intra-frequency cells is not allowed.

In accordance with another aspect of the disclosure, the at least one processor further configured to consider the other cells as candidates for cell selection or reselection for the pre-defined period barred, if the cell is a licensed cell and cell selection or reselection to intra-frequency cells is allowed.

In accordance with another aspect of the disclosure, the at least one processor further configured to exclude the cell as a candidate for cell selection or reselection for the pre-defined period, if the cell is an unlicensed cell.

In accordance with another aspect of the disclosure, the at least one processor further configured to exclude the other cells as candidates for cell selection or reselection for the pre-defined period, if cell selection or reselection to intra-frequency cells is not allowed and the cell belongs to a PLMN equivalent to a registered PLMN.

In accordance with another aspect of the disclosure, the at least one processor configured to determine whether the SIB1 is received while a timer for cell selection or reselection is running in an idle mode, an inactive mode or a connected mode.

In accordance with another aspect of the disclosure, the at least one processor further configured to acquire a master information block (MIB) from the cell, and a parameter intraFreqReselection included in the MIB indicates whether cell selection or reselection to the intra-frequency cells is allowed.

In accordance with another aspect of the disclosure, a user equipment (UE) in a wireless communication system. The UE includes a transceiver, at least one memory storing instructions for cell barring and at least one processor configured to execute the instructions to determining whether the a barred cell is a licensed cell or an unlicensed cell, determine whether the barred cell belongs to a PLMN equivalent to a registered PLMN and excluding cells on a same frequency as the barred cell as candidates for cell selection or reselection for a pre-defined period if cell selection or reselection to the intra-frequency cells is not allowed, the barred cell is an unlicensed cell and the barred cell belongs to a PLMN equivalent to a registered PLMN.

In accordance with another aspect of the disclosure, the at least one processor further configured to exclude the barred cell as a candidate for cell selection or reselection for the pre-defined period, if cell selection or reselection to intra-frequency cells is not allowed, the barred cell is unlicensed cell and the barred cell does not belong to the PLMN equivalent to the registered PLMN.

In accordance with another aspect of the disclosure, the at least one processor further configured to exclude the cells on the same frequency as the cell as a candidate for cell selection or reselection for the pre-defined period, if cell selection or reselection to intra-frequency cells is not allowed and the barred cell is a licensed cell.

In accordance with another aspect of the disclosure, the at least one processor further configured to acquire master information block (MIB) from the barred cell, parameter intraFreqReselection included in the MIB indicates whether cell selection or reselection to intra-frequency cells is allowed, and parameter cellBarred included in the MIB indicates barring of the barred cell.

In accordance with another aspect of the disclosure, the at least one processor further configured to determine whether the barred cell belongs to the PLMN equivalent to the registered PLMN by acquiring system information block type 1 (SIB1) of the cell.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
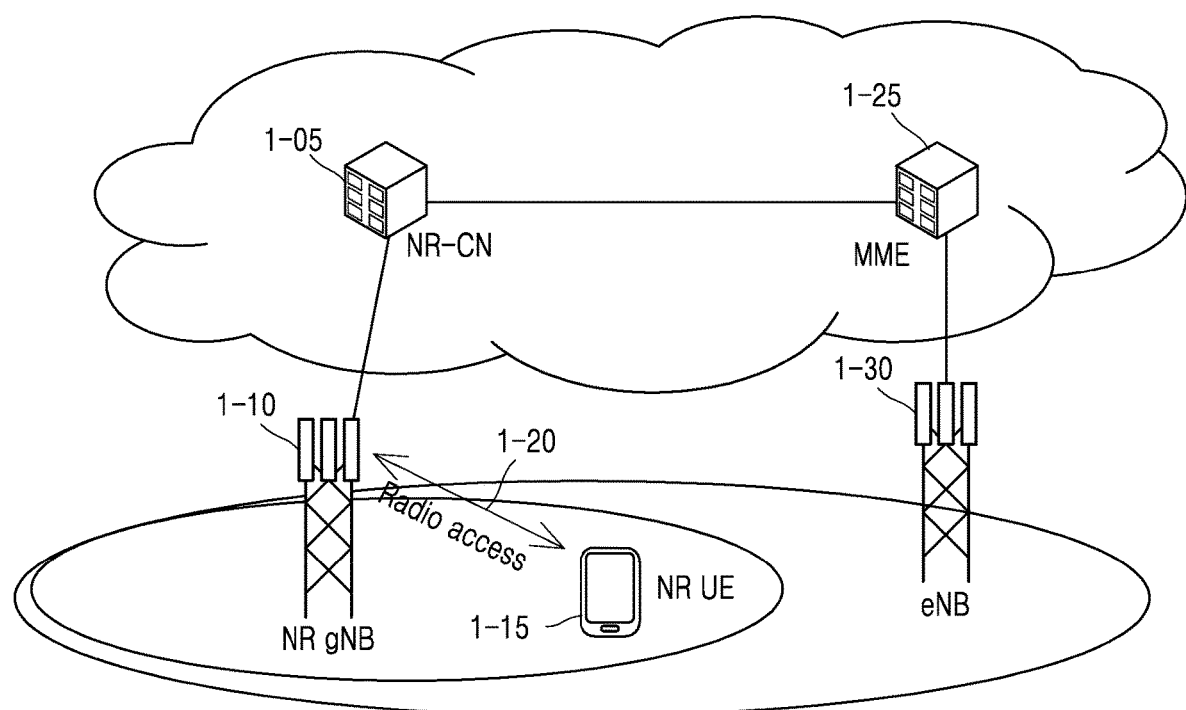
FIG. 1 illustrates a structure of a next-generation mobile communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While describing the embodiments of the disclosure, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list.

Advantages and features of one or more embodiments of the disclosure and methods of accomplishing the same may be understood more readily by reference to the following detailed description of the embodiments and the accompanying drawings. In this regard, the embodiments may have different forms and should not be construed as being limited to the descriptions set forth herein. Rather, these embodiments are provided so that this disclosure will be thorough and complete and will fully convey the concept of the embodiments to one of ordinary skill in the art, and the disclosure will only be defined by the appended claims.

Here, it will be understood that combinations of blocks in flowcharts or process flow diagrams may be performed by computer program instructions. Because these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments of the disclosure, the "unit" may include at least one processor.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

A wireless communication system has evolved from providing initial voice-oriented services to, for example, a broadband wireless communication system providing a high-speed and high-quality packet data service, such as communication standards of high speed packet access (HSPA), long-term evolution (LTE) or evolved universal terrestrial radio access (E-UTRA), and LTE-Advanced (LTE-A) of 3GPP, high rate packet data (HRPD) and ultra mobile broadband (UMB) of 3GPP2, and IEEE 802.16e. A 5th generation (5G) or new radio (NR) communication standards are being developed with 5G wireless communication systems.

Hereinafter, one or more embodiments will be described with reference to accompanying drawings. Also, in the description of the disclosure, certain detailed explanations of related functions or configurations are omitted when it is deemed that they may unnecessarily obscure the essence of the disclosure. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies, and thus, the terms used herein have to be defined based on the meaning of the terms together with the description throughout the specification. Hereinafter, a base station may be a subject performing resource assignment of a terminal, and may be at least one of a gNode B, an eNode B, a Node B, a base station (BS), a wireless access unit, a base station controller, and a node on a network. A terminal may include user equipment (UE), a mobile station (MS), a cellular phone, a smart phone, a computer, or a multimedia system capable of performing communication functions. In the disclosure, a downlink (DL) is a wireless transmission path of a signal transmitted from a base station to a terminal, and a UL is a wireless transmission path of a signal transmitted from a terminal to a base station. Also, hereinbelow, one or more embodiments of the disclosure will be described as an example of an LTE or LTE-A system, but the one or more embodiments may also be applied to other communication systems having a similar technical background or channel form. For example, 5G mobile communication technology (5G, new radio, NR) developed after LTE-A may be included. In addition, the one or more embodiments may be applied to other communication systems through some modifications within the scope of the disclosure without departing from the scope of the disclosure according to a person skilled in the art.

In an LTE system as a representative example of the broadband wireless communication system, an orthogonal frequency division multiplexing (OFDM) scheme is used in a DL and a single carrier frequency division multiplexing (SC-FDMA) scheme is used in an uplink (UL). The UL refers to a wireless link through which a terminal, UE, or a MS transmits data or control signals to a BS or a gNode B, and the DL refers to a wireless link through which a BS transmits data or control signals to a terminal. In such a multiple access scheme, data or control information of each user is classified by generally assigning and operating the data or control information such that time-frequency resources for transmitting data or control information for each user do not overlap each other, that is, such that orthogonality is established.

Terms such as a physical channel and a signal in an existing LTE or LTE-A system may be used to describe methods and apparatuses suggested in the disclosure. However, the content of the disclosure is applied to a wireless communication system, for example, 5th generation (5G) or new radio (NR) communication system, instead of the LTE or LTE-A system.

As a future communication system after the LTE, the 5G communication system needs to freely reflect various demands from users and service providers and thus support services that simultaneously meet the various demands. The services considered for the 5G communication system may include enhanced Mobile Broadband (eMBB), massive Machine Type Communication (mMTC), Ultra Reliability Low Latency Communication (URLL), etc.

The eMBB requirements like tens of Gbps data rate, low latency, high mobility so on and so forth address the market segment representing the wireless broadband subscribers needing internet connectivity everywhere, all the time and on the go, according to the related art. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enablers for autonomous cars.

Those three services considered in the aforementioned 5G communication system, i.e., eMBB, URLLC, and mMTC, may be multiplexed and transmitted from a single system. In this case, to meet different requirements for the three services, different transmission or reception schemes and parameters may be used between the services. The mMTC, URLLC, and eMBB are an example of different types of services, and embodiments of the disclosure are not limited to the service types.

FIG. 1 illustrates a structure of a next-generation mobile communication system according to an embodiment of the disclosure.

Referring to FIG. 1, a radio access network of the next-generation mobile communication system (5G or NR system) may include a new radio node B (NR NB, NR gNB, or NR eNB) 1-10 and a new radio core network (NR CN or a next generation core network (NG CN) 1-05. A new radio user equipment (NR UE or UE) 1-15 may access an external network through the NR gNB 1-10 and the NR CN 1-05.

Referring to FIG. 1, the NR gNB 1-10 may correspond to an evolved Node B (eNB) of an LTE system. The NR gNB 1-10 may be connected to the NR UE 1-15 over a radio channel 1-20 and may provide a more advanced service than that of the existing Node B. In the next-generation mobile communication system, all user traffic is served through a shared channel, requiring a device that collects state information, such as UEs' buffer status, available transmission power state, and channel state, and performs scheduling, in which the NR gNB 1-10 may be responsible for these functions. One NR gNB 1-10 may generally control a plurality of cells, and include a central unit (CU) managing control and signaling and a distributed unit (DU) in charge of signal transmission/reception. In order to realize ultra-high-speed data transmission compared to an LTE system, the next-generation mobile communication system (5G or NR system) may have a maximum bandwidth greater than the existing maximum bandwidth and may employ a beamforming technique in addition to orthogonal frequency division multiplexing (OFDM) as a radio access technology. Also, adaptive modulation & coding (AMC) may be used in which a modulation scheme and a channel coding rate are determined based on a channel state of a UE. The NR CN 1-05 may perform functions such as mobility support, bearer setup, QoS setup, etc. The NR CN 1-05 may be a device that performs not only a mobility management function for a UE but also various control functions and may be connected to a plurality of base stations. The next-generation mobile communication system (5G or NR system) may also interwork with the existing LTE system, in which the NR CN 1-105 may be connected to a mobility management entity (MME) 1-25 through a network interface. The MME 1-25 may be connected to the eNB 1-30, which is an existing eNB.

Figure 2:
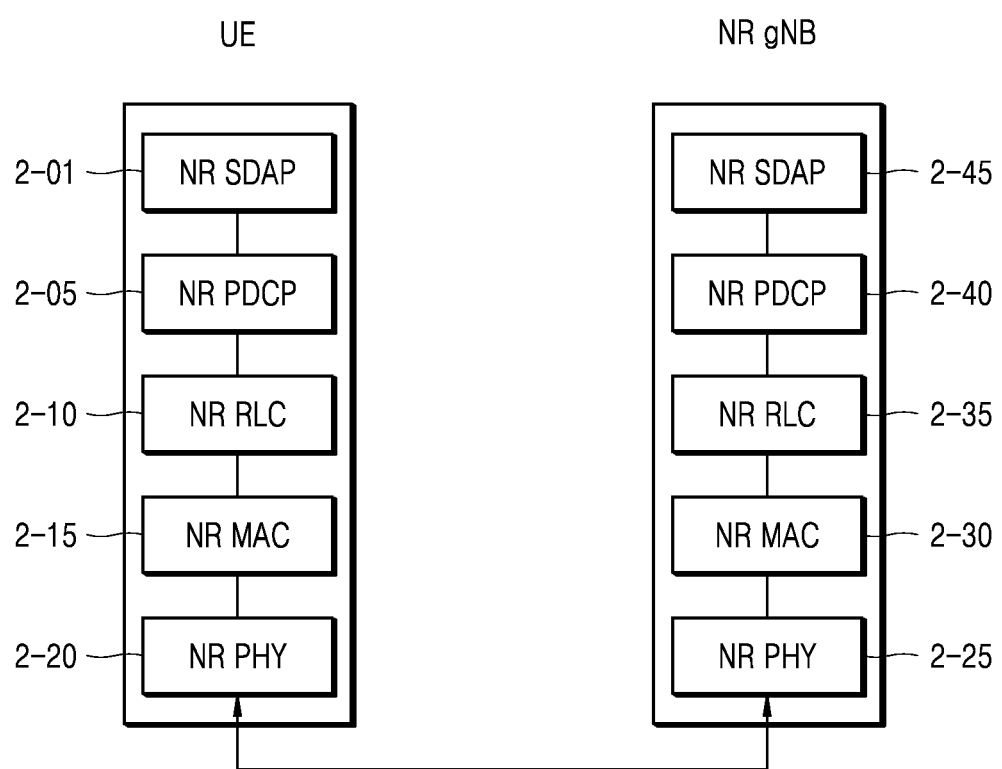
FIG. 2 illustrates a radio protocol architecture of a next-generation mobile communication system according to an embodiment of the disclosure.

FIG. 2 illustrates a radio protocol architecture of a next-generation mobile communication system according to an embodiment of the disclosure.

Referring to FIG. 2, a radio protocol of the next-generation mobile communication system (5G or NR system) may include NR service data adaptation protocol layers (SDAPs) 2-01 and 2-45, NR packet data convergence protocol layers (PDCPs) 2-05 and 2-40, NR radio link control layers (RLCs) 2-10 and 2-35, and NR media access control layers (MACs) 2-15 and 2-30, respectively at a UE and an NR gNB.

Main functions of the NR SDAPs 2-01 and 2-45 may include some of the following functions:

Transfer of user plane data
Mapping between a quality of service (QoS) flow and a DRB for both DL and UL
Marking QoS flow identification (ID) in both DL and UL packets
Mapping of reflective QoS flow to DRB for the UL SDAP PDUs For an SDAP layer device, a UE may be set whether to use a header of an SDAP layer device or a function of the SDAP layer device for each PDCP layer device or each bearer or logical channel through radio resource control (RRC) message. When an SDAP header is set, it may be indicated using a network attached storage (NAS) QoS reflective configuration 1-bit indicator (NAS reflective QoS) and an AS QoS reflective configuration 1-bit indicator (AS reflective QoS) that the UE may update or reconfigure a QoS flow of an uplink and a downlink and mapping information regarding a data bearer. The SDAP header may include QoS flow ID information indicating a QoS. The QoS information may be used as data processing priority information, scheduling information, etc., for supporting a smooth service.

Main functions of the NR PDCPs 2-05 and 2-40 may include some of the following functions:

Header compression and decompression: (ROHC only)
Transfer of user data
In-sequence delivery of upper layer PDUs
Out-of-sequence delivery of upper layer PDUs
PDCP protocol data unit (PDU) reordering for reception
Duplicate detection of lower layer service data unit (SDUs)
Retransmission of PDCP SDUs
Ciphering and deciphering
Timer-based SDU discard in uplink)

Herein, the reordering function of the NR PDCP devices refers to a function of rearranging PDCP PDUs received in a lower layer in order based on a PDCP sequence number (SN), and may include a function of transmitting data to an upper layer in the order of rearrangement or a function of immediately transmitting the data regardless of order, and may also include a function of recording lost PDCP PDUs through reordering, a function of reporting the state of lost PDCP PDUs to a transmitter, and a function of requesting retransmission of lost PDCP PDUs.

Main functions of the NR RLCs 2-10 and 2-35 may include some of the following functions:

Transfer of upper layer PDUs
In-sequence delivery of upper layer PDUs
Out-of-sequence delivery of upper layer PDUs
Error correction through automatic repeat request (ARQ)
Concatenation, segmentation and reassembly of RLC SDUs
Re-segmentation of RLC data PDUs
Reordering of RLC data PDUs
Duplicate detection
Protocol error detection
RLC SDU discard
RLC re-establishment Herein, the in-sequence delivery function of the NR RLC devices refers to a function of delivering RLC SDUs received from a lower layer to an upper layer in order. More specifically, the in-sequence delivery function of the NR RLC devices may include a function of re-assembling and delivering a plurality of RLC SDUs when one original RLCSDU is divided into the plurality of RLC SDUs to be received, a function of rearranging received RLC PDUs based on the RLC SN or the PDCP SN, a function of recording lost RLC PDUs through reordering, a function of reporting the state of lost RLC PDUs to a transmitter, a function of requesting retransmission of lost RLC PDUs, a function of delivering only RLC SDUs before a lost RLC SDU to an upper layer in order in case of the presence of the lost RLC SDU, a function of delivering all RLC SDUs, received before a timer starts, to an upper layer in order when the timer has expired despite the presence of a lost RLC SDU, and a function of delivering all RLC SDUs received so far to an upper layer in order when the timer expires despite the presence of a lost RLC SDU.

The NR RLC devices may process RLC PDUs in order of reception (the order of arrival regardless of the order of SNs) and deliver the RLC PDUs to the PDCP devices in an out-of-sequence manner, and for a segment, the NR RLC devices may receive segments that are stored in a buffer or are to be received later, may reconstruct the segment into one whole RLC PDU, may process the RLC PDU, and may deliver the RLC PDU to the PDCP devices. The NR RLC layers may not include a concatenation function, and the concatenation function may be performed in the NR MAC layers or may be replaced with a multiplexing function of the NR MAC layers.

Herein, the out-of-sequence delivery function of the NR RLC devices refers to a function of delivering RLC SDUs received from a lower layer directly to an upper layer regardless of order, and may include a function of re-assembling and delivering a plurality of RLC SDUs when one original RLC SDU is divided into the plurality of RLC SDUs to be received, and a function of recording lost RLC PDUs by storing and reordering the RLC SNs or PDCP SNs of received RLC PDUs.

The NR MACs 2-15 and 2-30 may be connected to a plurality of NR RLC-layer devices configured in one UE, and main functions of the NR MACs may include some of the following functions:

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding NR physical layers (PHYs) 2-20 and 2-25 may perform channel coding and modulation of upper-layer data and convert the data into OFDM symbols to transmit the OFDM symbols through a radio channel, or demodulate OFDM symbols received through a radio channel and perform channel decoding of the OFDM symbols to deliver the OFDM symbols to an upper layer.

Figure 3:
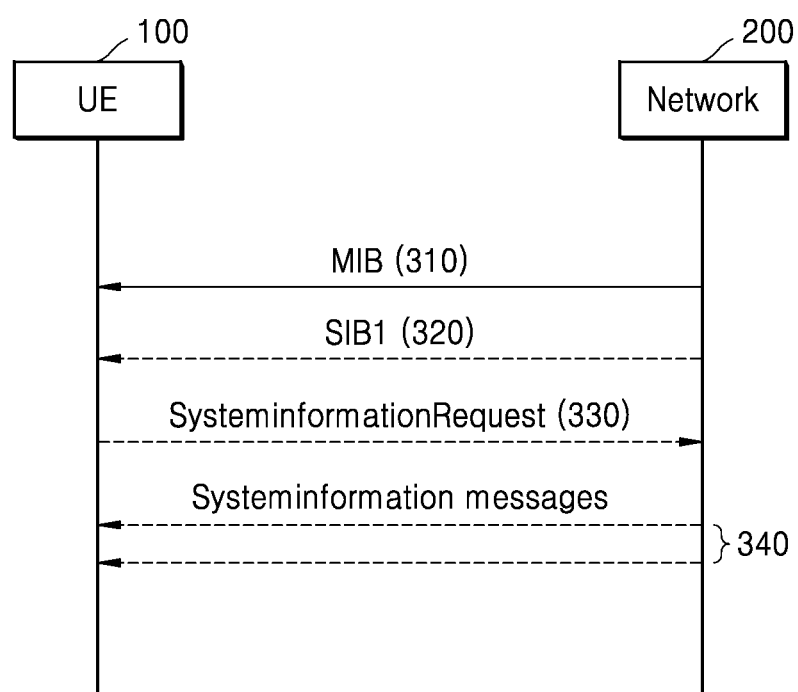
FIG. 3 illustrates a system information acquisition procedure in a wireless communication system, according to an embodiment of the disclosure.

FIG. 3 illustrates a system information acquisition procedure in a wireless communication system, according to an embodiment of the disclosure.

Referring to FIG. 3, in operation 310, the UE 100 acquires master information block (MIB) from the Network 200. MIB may include information that are needed to acquire System Information Block Type 1 (SIB1).

In operation 320, UE 100 acquires SIB1. The UE 100 may acquire SIB1 based on MIB.

In operation 330, the UE 100 may transmit system information request to Network 200. The system information request may be transmitted based on the MIB and/or SIB1.

In operation 340, the UE 100 receives system information messages from Network 200. System information message includes periodic system information message requested system information message. Requested system information message may include a system information message transmitted by the Network 200 according to the system information request from the UE 100. Periodic system information message may include a system information message periodically transmitted by the Network 200. Periodic system information message may include requested system information. That is, Periodic system information message may include information requested by the system information request.

In the $4^{th}$-generation (4G) wireless communication system, enhanced node B (eNB) or base station in cell broadcast system information. System information is structured into master information block (MIB) and a set of system information blocks (SIBs). MIB consists of System Frame Number (SFN), Downlink System bandwidth and Physical Hybrid ARQ Feedback Indicator Channel (PHICH) configuration. MIB is transmitted every 40 ms. It is repeated every 10 ms wherein the first transmission occurs in subframe #0 when SFM mod 4 equals zero. MIB is transmitted on physical broadcast channel, system information block type 1 carries cell indemnity, tracking area code, cell barring information, value tag (common for all scheduling units), and scheduling information of other SIBs. SIB1 is transmitted every 80 ms in subframe #5 when SFN mod 8 equals zero. SIB1 is repeated in subframe #5 when SFN mod 2 equals zero. SIB1 is transmitted on Physical downlink shared channel. Other SIBs (SIB2 to SIB19) are transmitted in System Information (SI) message wherein scheduling info of these SIB s are indicated in SIB1.

UE acquires the system information at cell selection, cell reselection, after handover completion, after entering E-UTRA from another RAT, upon re-entering service area, upon receiving a notification (paging), and upon exceeding the maximum validity duration (3 hr). In RRC idle and inactive state, UE needs to acquire MIB, SIB1, SIB2 to SIB5, SIB6 to SIB8 (depending on RAT supported), SIB17 (if LTE-WLAN IWK is supported), and SIB18 to SIB19 (if D2D is supported). In RRC connected state, UE needs to acquire MIB, SIB1, SIB2, SIB8 (depending on RAT supported), SIB17 (if LTE-WLAN IWK is supported), and SIB18 to SIB19 (if D2D is supported).

In the $5^{th}$-generation (5G) wireless communication system (also referred as next generation radio or NR), System Information (SI) is divided into the MIB and a number of SIB s where:
  the MIB is always transmitted on the BCH with a periodicity of 80 ms and repetitions made within 80 ms and it includes parameters that are needed to acquire SIB1 from the cell.
  the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
  SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

NR supports barring cell(s) for a pre-defined time. If a cell is barred, UE excludes that cell as a candidate for cell selection/reselection for a pre-defined time (i.e. 300 seconds). In NR one or more cell(s) can be barred when certain criteria is met, as explained below:

1. UE acquires MIB from a cell. In the acquired MIB if parameter cellBarred is set to 'Barred' and parameter intraFreqReselection is set to 'notAllowed', UE bars this cell and all cells on frequency (or carrier) of this cell for 300 seconds. The UE shall exclude this cell and the cells on this cell's frequency as a candidate for cell selection/reselection for 300 seconds.
2. UE acquires MIB from a cell. In the acquired MIB if parameter cellBarred is set to 'Barred' and parameter intraFreqReselection is set to 'allowed', UE bars this cell for 300 seconds. The UE shall exclude this cell as a candidate for cell selection/reselection for 300 seconds.
3. UE fails to acquire MIB from a cell. In this case, UE bars this cell and all cells on frequency (or carrier) of this cell for 300 seconds. The UE shall exclude this cell and the cells on this cell's frequency as a candidate for cell selection/reselection for 300 seconds.
4. UE fails to acquire SIB1 from a cell. In the acquired MIB from this cell if parameter intraFreqReselection is set to 'notAllowed', UE bars this cell and all cells on frequency (or carrier) of this cell for 300 seconds. The UE shall exclude this cell and the cells on this cell's frequency as a candidate for cell selection/reselection for 300 seconds.
5. UE fails to acquire SIB1 from a cell. In the acquired MIB from this cell if parameter intraFreqReselection is set to 'allowed', UE bars this cell for 300 seconds. The UE shall exclude this cell as a candidate for cell selection/reselection for 300 seconds.

In case of licensed spectrum, all cells on a carrier belongs to same PLMN(s). However, in case of unlicensed spectrum, multiple operators can deploy their own networks in the unlicensed band. This means that there can be multiple cells belonging to different PLMNs on a carrier. As a result the current barring mechanisms is not efficient. It may unnecessarily delay the cell selection or reselection.

For example, let's say UE acquire MIB from a cell. In the acquired MIB, parameter cellBarred is set to barred and parameter intraFreqReselection is set to notAllowed. The cell 1 belongs to PLMN A. UE's PLMN is PLMN B. As per the current rule, in this scenario, all cells in frequency of cell 1 are barred. Barring all cells on frequency of cell 1 will unnecessarily delay the cell selection/reselection as UE will also bar the cell of PLMN B on frequency of cell 1.

In another example, let's say UE is not able to acquire MIB from a cell 1. As per the current rule, in this scenario, all cells in frequency of cell 1 are barred. Since UE has no idea about the PLMN of this cell, it may not be wise to consider all the cells on the frequency of this cell as barred. This cell may not belong to UE's PLMN and UE may find other cell's belonging to its PLMN which may not be barred. Barring all cells on frequency of cell 1 will unnecessarily delay the cell selection/reselection as UE will also bar the cell of PLMN B on frequency of cell 1.

Accordingly, cell barring needs to be enhanced.

Embodiment 1

Figure 4:
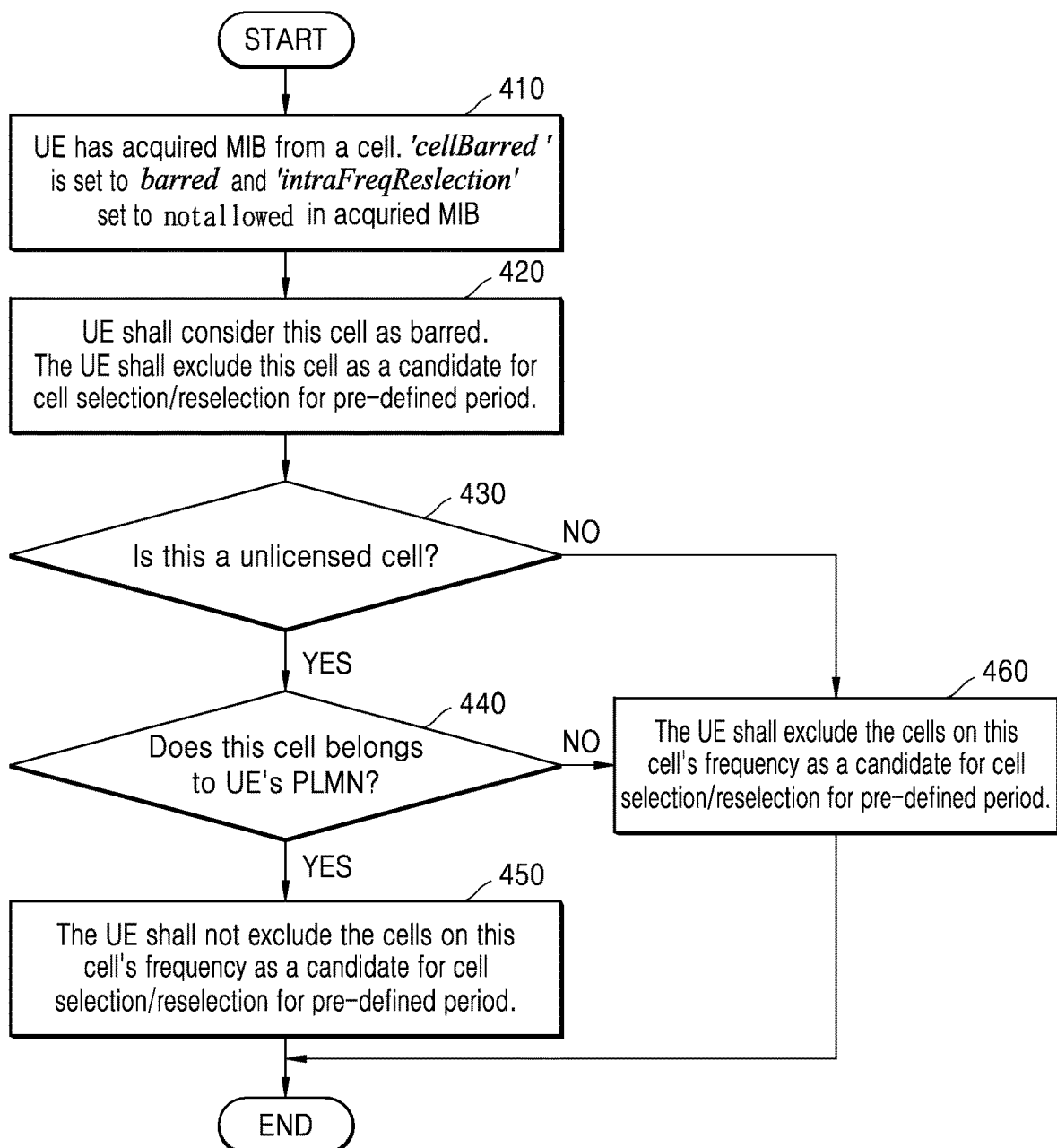
FIG. 4 is a flowchart illustrating a method for cell barring by a User Equipment (UE) in a wireless communication system according to an embodiment of the disclosure.

FIG. 4 is a flowchart illustrating a method for cell barring by a User Equipment (UE) in a wireless communication system according to an embodiment of the disclosure.

Referring to FIG. 4, the procedure for cell barring upon MIB acquisition according to an embodiment of the disclosure. In operation 410, UE has acquired MIB from a cell in RRC_IDLE state or in RRC_INACTIVE state or in RRC_CONNECTED state while T311 is running. In the acquired MIB, parameter cellBarred is set to barred and parameter 'intraFreqReselection' is set to notAllowed. Parameter cellBarred indicates barring of a cell which transmitted MIB. Parameter cellBarred may be set to barred/notBarred. The value barred means that the cell is barred and the value notBarred means that the cell is not barred. Parameter intraFreqReselection indicates allowance of cell selection or reselection to the intra-frequency cells. That is Parameter intraFreqReselection controls cell selection/reselection to intra-frequency cells when the highest ranked cell is barred, or treated as barred by the UE. Parameter intraFreqReselection may be set to allowed/notAllowed. The value allowed means that cell selection or reselection to intra-frequency cells is allowed and the value notAllowed means that cell selection or reselection to intra-frequency cells is not allowed.

In this case UE shall perform the following operation:
1> UE shall consider this cell as barred. UE shall exclude this cell as a candidate for cell selection/reselection for a pre-defined period (e.g. 300 seconds). The time period for which the cell is barred can also be signaled by gNB at operation 420.
1> If this cell is an unlicensed cell (i.e. carrier frequency of this cell belongs to unlicensed frequency band or spectrum) at operation 430:
  2> If this cell belongs to UE's PLMN (i.e. registered PLMN or equivalent PLMN) at operation 440:
    3> UE shall exclude the cells on this cell's frequency as candidate for cell selection/reselection for a pre-defined period (e.g. 300 seconds). The time period for which the cell is barred can also be signaled by gNB at operation 460.
  2> else (i.e. if this cell does not belong to UE's PLMN) at operation 440
    3> UE shall not exclude other cells on this cell's frequency as candidate for cell selection/reselection for a pre-defined period (e.g. 300 seconds). That is, UE shall exclude this cell as a candidate for cell selection/reselection for a pre-defined period and may perform cell selection/reselection to other cells on this cell's frequency. The time period for which the cell is barred can also be signaled by gNB at operation 450.
1> else (i.e. if this cell is a licensed cell) at operation 430:
  2> UE shall exclude the cells on this cell's frequency as candidate for cell selection/reselection for a pre-defined period (e.g. 300 seconds). The time period for which the cell is barred can also be signaled by gNB at operation 460.

In an embodiment, UE can determine that the cell belongs to UE's PLMN based on the SIB1 of this cell. If the PLMN identity of UE's PLMN is included in PLMNIdentityList in acquired SIB1, UE can determine that cell belongs to UE's PLMN.

In an alternate embodiment a cell may provide a list of PLMNs operating on neighboring carrier frequency. This information can be provided for multiple carrier frequencies. This information can be signaled in system information. So, UE may have information about a list of PLMNs operating on carrier frequency of this cell based on system information acquired from another cell. Alternately, UE can receive this information from core network in NAS signaling. If the UE's PLMN is not included in this list, UE can determine that this cell does not belong to UE's PLMN.

In an alternate embodiment, a cell may provide a list of PCIs corresponding to a PLMN. This information can be provided for multiple PLMNs. This information can be signaled in system information. So, UE may have information about a list of PCIs corresponding to one or more PLMNs based on system information acquired from another cell. If this cell's PCI is included in that information, UE can identify the PLMN of this cell hence determine if this cell belongs to this PLMN or not.

In an alternate embodiment, PLMN(s) associated with a cell can be signaled in MIB. UE can determine that the cell belongs to UE's PLMN by reading the MIB of this cell. If the PLMN identity of UE's PLMN is included in acquired MIB, UE can determine that cell belongs to UE's PLMN.

In an alternate embodiment, PLMN(s) associated with a cell can be signaled in PBCH. UE can determine that the cell belongs to UE's PLMN by acquiring PBCH of this cell. If the PLMN identity of UE's PLMN is included in acquired PBCH, UE can determine that cell belongs to UE's PLMN.

If UE is not able to determine that the cell belongs to its PLMN or not, it will simply bar this cell. It shall not bar other cells on frequency of this cell.

Embodiment 2

Figure 5:
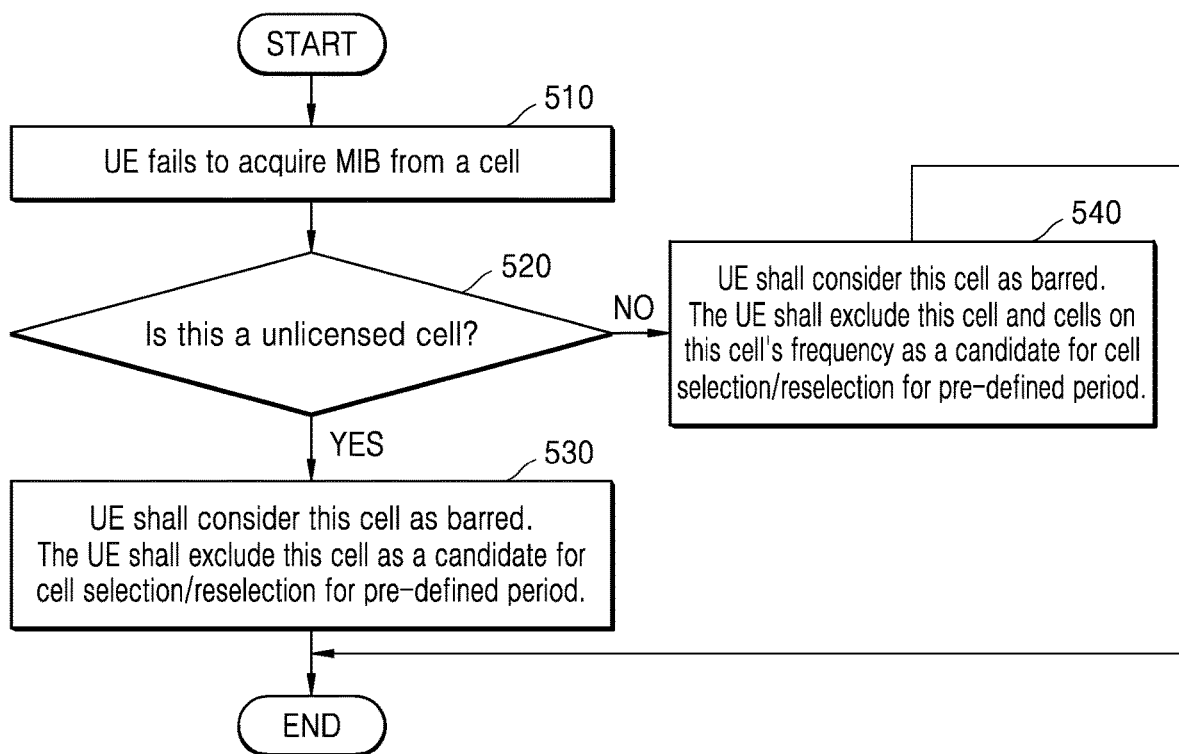
FIG. 5 is a flowchart illustrating another method for cell barring by a User Equipment (UE) in a wireless communication system according to an embodiment of the disclosure.

FIG. 5 is a flowchart illustrating another method for cell barring by a User Equipment (UE) in a wireless communication system according to an embodiment of the disclosure.

Referring to FIG. 5, the procedure for cell barring according to an embodiment of the disclosure. In operation 510, UE fails to acquire MIB from a cell in RRC_IDLE or in RRC_INACTIVE or in RRC_CONNECTED while T311 is running.

In this case UE shall perform the following operation:
1> If this cell is an unlicensed cell (i.e. carrier frequency of this cell belongs to unlicensed frequency band or spectrum) at operation 520:
   2> UE shall consider this cell as barred. UE shall exclude this cell as a candidate for cell selection/reselection for a pre-defined period (e.g. 300 seconds). The time period for which the cell is barred can also be signaled by gNB at operation 530.
1> else (i.e. if this cell is a licensed cell) at operation 520:
   2> UE shall exclude this cell and the cells on this cell's frequency as candidate for cell selection/reselection for a pre-defined period (e.g. 300 seconds). The time period for which the cell is barred can also be signaled by gNB at operation 540.

Embodiment 3

Figure 6:
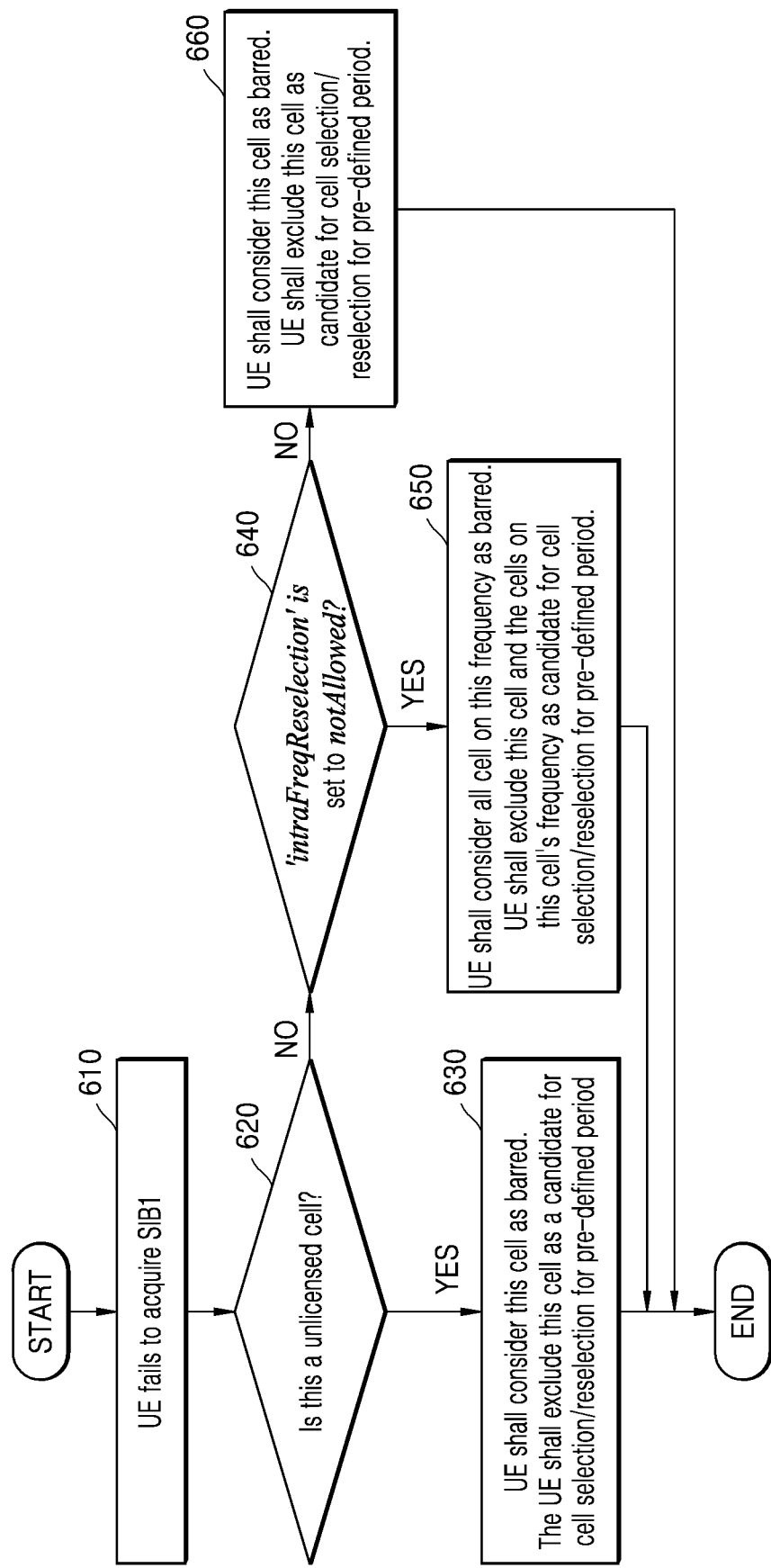
FIG. 6 is a flowchart illustrating another method for cell barring by a User Equipment (UE) in a wireless communication system according to an embodiment of the disclosure.

FIG. 6 is a flowchart illustrating another method for cell barring by a User Equipment (UE) in a wireless communication system according to an embodiment of the disclosure.

Referring to FIG. 6, the procedure for cell barring according to an embodiment of the disclosure. In operation 610, UE fails to acquire SIB1 from a cell in RRC_IDLE or in RRC_INACTIVE or in RRC_CONNECTED while T311 is running.

In this case UE shall perform the following operation:
1> If this cell is an unlicensed cell (i.e. carrier frequency of this cell belongs to unlicensed frequency band or spectrum) at operation 620:
   2> UE shall consider this cell as barred. UE shall exclude this cell as a candidate for cell selection/reselection for a pre-defined period (e.g. 300 seconds). The time period for which the cell is barred can also be signaled by gNB at operation 630.
1> else (i.e. if this cell is a licensed cell) at operation 620:
   2> if parameter intraFreqReselection is set to notAllowed in MIB: (operation 640)
      3> UE shall consider all cells on this frequency as barred. UE shall exclude this cell and the cells on this cell's frequency as candidate for cell selection/reselection for a pre-defined period (e.g. 300 seconds). The time period for which the cell is barred can also be signaled by gNB at operation 650.
   2> if parameter intraFreqReselection is set to allowed in MIB at operation 640:
      3> UE shall consider this cell as barred. UE shall exclude this cell as candidate for cell selection/reselection for a pre-defined period (e.g. 300 seconds). The time period for which the cell is barred can also be signaled by gNB at operation 660.

Parameter intraFreqReselection indicates allowance of cell selection or reselection to the intra-frequency cells. That is Parameter intraFreqReselection controls cell selection/reselection to intra-frequency cells when the highest ranked cell is barred, or treated as barred by the UE. Parameter intraFreqReselection may be set to allowed/notAllowed. The value allowed means that cell selection or reselection to intra-frequency cells is allowed and the value notAllowed means that cell selection or reselection to intra-frequency cells is not allowed.

Embodiment 4

Figure 7:
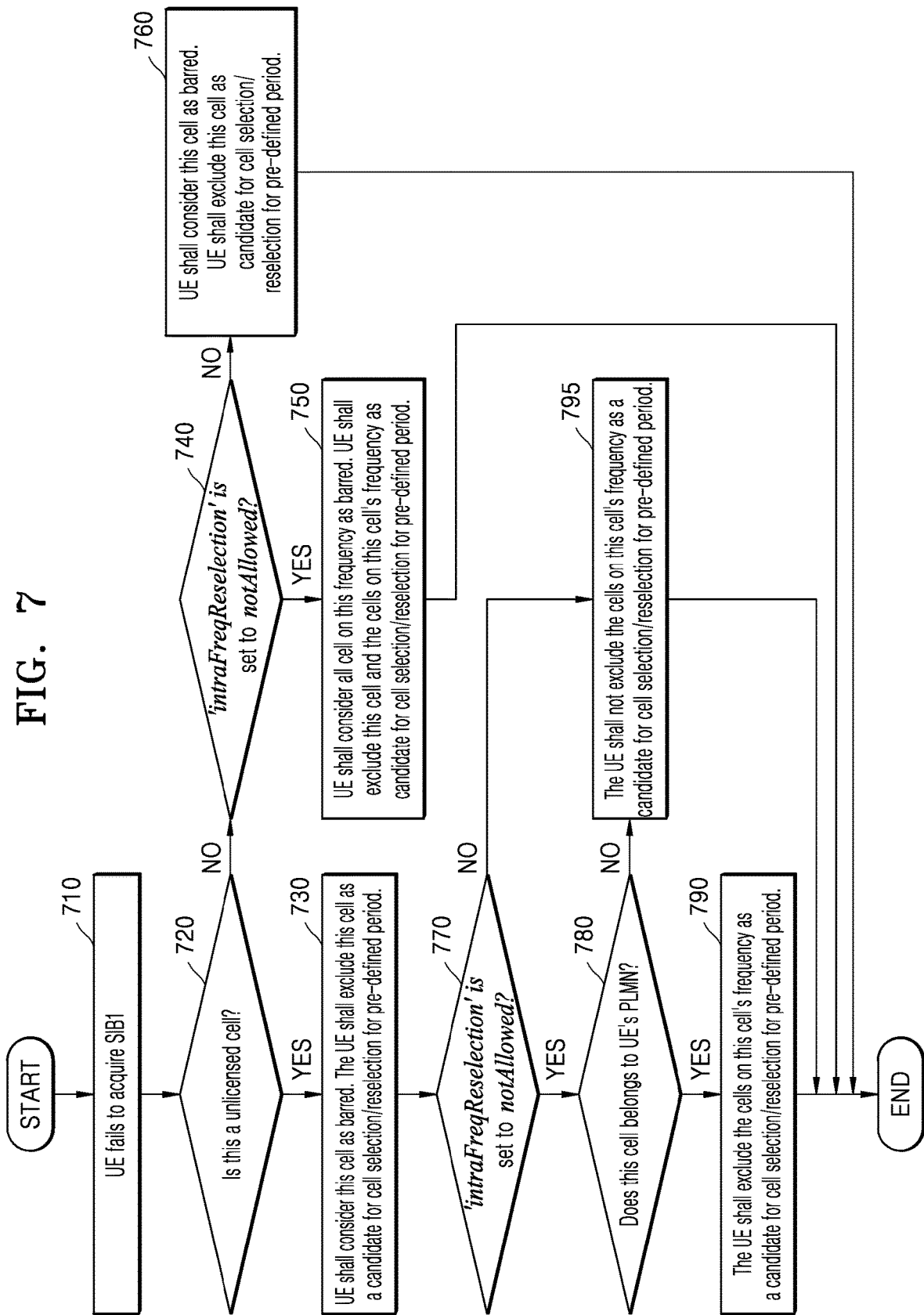
FIG. 7 is a flowchart illustrating another method for cell barring by a User Equipment (UE) in a wireless communication system according to an embodiment of the disclosure.

FIG. 7 is a flowchart illustrating another method for cell barring by a User Equipment (UE) in a wireless communication system according to an embodiment of the disclosure.

Referring to FIG. 7, the procedure for cell barring according to an embodiment of the disclosure. In operation 710, UE fails to acquire SIB1 from a cell in RRC_IDLE or in RRC_INACTIVE or in RRC_CONNECTED while T311 is running.

In this case UE shall perform the following operation:
1> If this cell is an unlicensed cell (i.e. carrier frequency of this cell belongs to unlicensed frequency band or spectrum) at operation 720:
   2> UE shall consider this cell as barred. UE shall exclude this cell as a candidate for cell selection/reselection for a pre-defined period (e.g. 300 seconds). The time period for which the cell is barred can also be signaled by gNB at operation 730.
   2> if parameter 'intraFreqReselection' is set to notAllowed in MIB at operation 770:
      3> if this cell belongs to UE's PLMN (i.e. registered PLMN or equivalent PLMN) at operation 780:
         4> UE shall exclude the cells on this cell's frequency as candidate for cell selection/reselection for a pre-defined period (e.g. 300 seconds). The time period for which the cell is barred can also be signaled by gNB0 at operation 790.

1> else (i.e. if this cell is a licensed cell) at operation 720:
   3> else (i.e. if this cell does not belong to UE's PLMN) at operation 780
      4> UE shall not exclude other cells on this cell's frequency as candidate for cell selection/reselection for a pre-defined (e.g. 300 seconds). That is, UE shall exclude this cell as a candidate for cell selection/reselection for a pre-defined period and may perform cell selection/reselection to other cells on this cell's frequency. The time period for which the cell is barred can also be signaled by gNB at operation 795.

1> else (i.e. if this cell is a licensed cell) at operation 720:
   2> if parameter 'intraFreqReselection' is set to notAllowed in MIB: (operation 740)
      3> UE shall consider all cells on this frequency as barred. UE shall exclude this cell and the cells on this cell's frequency as candidate for cell selection/reselection for a pre-defined period (e.g. 300 seconds). The time period for which the cell is barred can also be signaled by gNB at operation 750.
   2> if parameter 'intraFreqReselection' is set to allowed in MIB at operation 740:
      3> UE shall consider this cell as barred. UE shall exclude this cell as candidate for cell selection/reselection for a pre-defined period (e.g. 300 seconds). The time period for which the cell is barred can also be signaled by gNB at operation 760.

Parameter intraFreqReselection indicates allowance of cell selection or reselection to the intra-frequency cells. That is Parameter intraFreqReselection controls cell selection/reselection to intra-frequency cells when the highest ranked cell is barred, or treated as barred by the UE. Parameter intraFreqReselection may be set to allowed/notAllowed. The value allowed means that cell selection or reselection to intra-frequency cells is allowed and the value notAllowed means that cell selection or reselection to intra-frequency cells is not allowed.

In the above operation UE can determine whether cell belongs to its PLMN as follows:

In an embodiment a cell may provide a list of PLMNs operating on neighboring carrier frequency. This information can be provided for multiple carrier frequencies. This information can be signaled in system information. So, UE may have information about a list of PLMNs operating on carrier frequency of this cell based on system information acquired from another cell. Alternately UE can receive this information from core network in NAS signaling. If the UE's PLMN is not included in this list, UE can determine that this cell does not belong to UE's PLMN.

In an alternate embodiment, a cell may provide a list of PCIs corresponding to a PLMN. This information can be provided for multiple PLMNs. This information can be signaled in system information. So, UE may have information about a list of PCIs corresponding to one or more PLMNs based on system information acquired from another cell. If this cell's PCI is included in that information, UE can identify the PLMN of this cell hence determine if this cell belongs to this PLMN or not.

In an alternate embodiment, PLMN(s) associated with a cell can be signaled in MIB. UE can determine that the cell belongs to UE's PLMN by reading the MIB of this cell. If the PLMN identity of UE's PLMN is included in acquired MIB, UE can determine that cell belongs to UE's PLMN.

In an alternate embodiment, PLMN(s) associated with a cell can be signaled in PBCH. UE can determine that the cell belongs to UE's PLMN by acquiring PBCH of this cell. If the PLMN identity of UE's PLMN is included in acquired PBCH, UE can determine that cell belongs to UE's PLMN.

Figure 8:
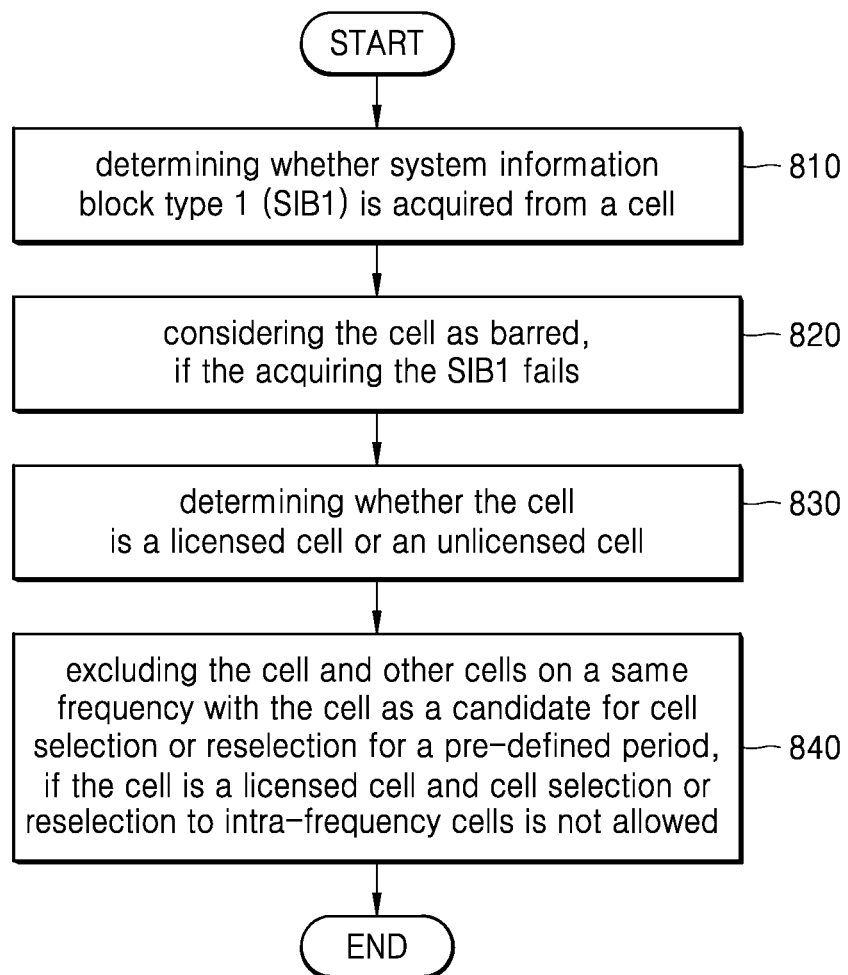
FIG. 8 is a flowchart illustrating another method for cell barring by a User Equipment (UE) in a wireless communication system according to an embodiment of the disclosure.

FIG. 8 is a flowchart illustrating another method for cell barring by a User Equipment (UE) in a wireless communication system according to an embodiment of the disclosure.

Referring to FIG. 8, in operation 810, UE determines whether system information block type 1 (SIB1) is acquired from a cell. UE may determine whether the SIB1 is received while a timer for cell selection or reselection is running in an idle mode, an inactive mode or a connected mode.

In an embodiment, UE may acquire master information block (MIB) from the cell. MIB may include parameter intraFreqReselection indicating allowance of cell selection or reselection to the intra-frequency cells. That is Parameter intraFreqReselection controls cell selection/reselection to intra-frequency cells when the highest ranked cell is barred, or treated as barred by the UE. Parameter intraFreqReselection may be set to allowed/notAllowed. The value allowed means that cell selection or reselection to intra-frequency cells is allowed and the value notAllowed means that cell selection or reselection to intra-frequency cells is not allowed.

In operation 820, UE considers the cell as barred, if the acquiring the SIB1 fails. In an embodiment, UE may bar the cell for pre-defined period (e.g. 300 seconds). The time period for which the cell is barred can also be signaled by gNB.

In operation 830, UE determines whether the cell is a licensed cell or an unlicensed cell. UE may determine the cell as a licensed cell if the cell operates in licensed spectrum and may determine the cell as an unlicensed cell if the cell operates in unlicensed spectrum.

In operation 840, UE excludes the cell and other cells on a same frequency with the cell as a candidate for cell selection or reselection for a pre-defined period, if the cell is a licensed cell and cell selection or reselection to intra-frequency cells is not allowed.

In an embodiment, UE may consider the other cells as the candidate for cell selection or reselection for the pre-defined period, if the cell is a licensed cell and cell selection or reselection to the intra-frequency cells is allowed. Thus, UE shall not exclude the other cells on this cell's frequency as candidate for cell selection/reselection for a pre-defined (e.g. 300 seconds). That is, UE shall exclude the cell as a candidate for cell selection/reselection for a pre-defined period and may perform cell selection/reselection to other cells on this cell's frequency.

In an embodiment, UE may exclude the cell as the candidate for cell selection or reselection for the pre-defined period, if the cell is unlicensed cell. and may perform cell selection/reselection to other cells on this cell's frequency. UE may exclude the other cells as the candidate for cell selection or reselection for the pre-defined period, if cell selection or reselection to the intra-frequency cells is not allowed and the cell belongs to a PLMN equivalent to a registered PLMN.

Figure 9:
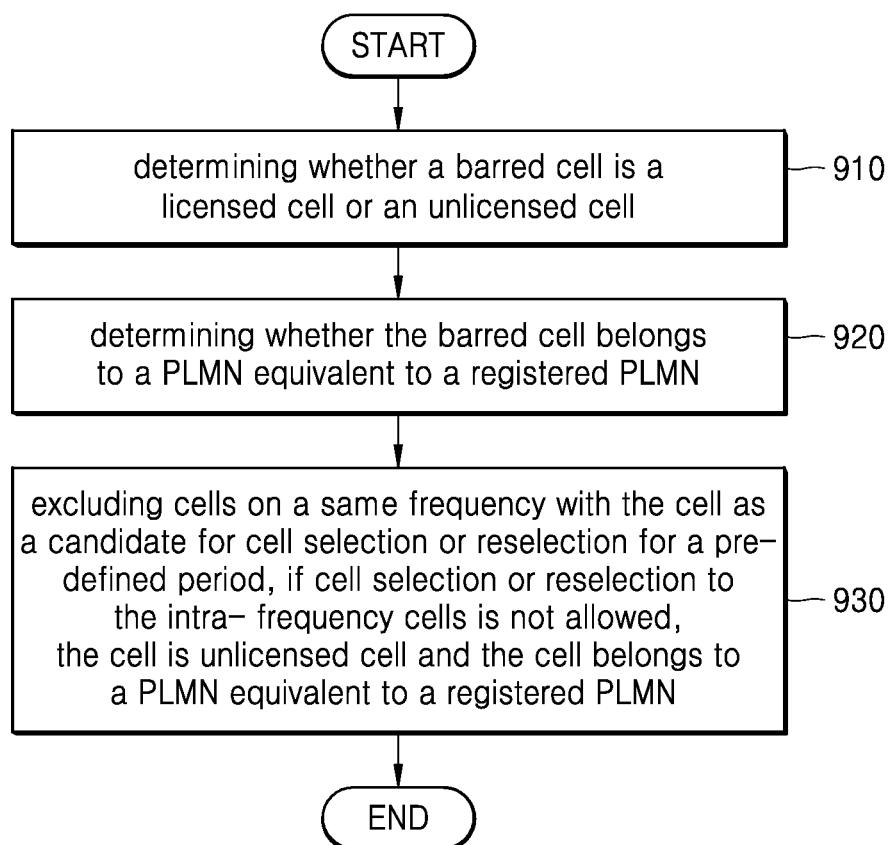
FIG. 9 is a flowchart illustrating another method for cell barring by a User Equipment (UE) in a wireless communication system according to an embodiment of the disclosure.

FIG. 9 is a flowchart illustrating another method for cell barring by a User Equipment (UE) in a wireless communication system according to an embodiment of the disclosure.

Referring to FIG. 9, in operation 910, UE determines whether a barred cell is a licensed cell or an unlicensed cell. UE may determine the cell as a licensed cell if the cell operates in licensed spectrum and may determine the cell as an unlicensed cell if the cell operates in unlicensed spectrum.

In operation 920, UE determines whether the barred cell belongs to a PLMN equivalent to a registered PLMN. In an embodiment, UE may determine whether the cell belongs to the PLMN equivalent to the registered PLMN by acquiring system information block type 1 (SIB1) of the cell. If the PLMN identity of UE's PLMN is included in PLMNIdentityList in acquired SIB1, UE can determine that cell belongs to UE's PLMN.

In an alternate embodiment a cell may provide a list of PLMNs operating on neighboring carrier frequency. This information can be provided for multiple carrier frequencies. This information can be signaled in system information. So, UE may have information about a list of PLMNs operating on carrier frequency of this cell based on system information acquired from another cell. Alternately, UE can receive this information from core network in NAS signaling. If the UE's PLMN is not included in this list, UE can determine that this cell does not belong to UE's PLMN.

In an alternate embodiment, a cell may provide a list of PCIs corresponding to a PLMN. This information can be provided for multiple PLMNs. This information can be signaled in system information. So, UE may have information about a list of PCIs corresponding to one or more PLMNs based on system information acquired from another cell. If this cell's PCI is included in that information, UE can identify the PLMN of this cell hence determine if this cell belongs to this PLMN or not.

In an alternate embodiment, PLMN(s) associated with a cell can be signaled in MIB. UE can determine that the cell belongs to UE's PLMN by reading the MIB of this cell. If the PLMN identity of UE's PLMN is included in acquired MIB, UE can determine that cell belongs to UE's PLMN.

In an alternate embodiment, PLMN(s) associated with a cell can be signaled in PBCH. UE can determine that the cell belongs to UE's PLMN by acquiring PBCH of this cell. If the PLMN identity of UE's PLMN is included in acquired PBCH, UE can determine that cell belongs to UE's PLMN.

In operation 930, UE excludes cells on a same frequency with the cell as a candidate for cell selection or reselection for a pre-defined period, if cell selection or reselection to the intra-frequency cells is not allowed, the cell is unlicensed cell and the cell belongs to a PLMN equivalent to a registered PLMN.

In an embodiment, UE may exclude the cell as the candidate for cell selection or reselection for the pre-defined period, if cell selection or reselection to the intra-frequency cells is not allowed, the cell is unlicensed cell and the cell does not belong to the PLMN equivalent to the registered PLMN.

In an embodiment, UE may exclude the cells on the same frequency with the cell as a candidate for cell selection or reselection for the pre-defined period, if cell selection or reselection to the intra-frequency cells is not allowed and the cell is licensed cell.

In an embodiment, UE may acquire master information block (MIB) from the cell. MIB may include parameter cellBarred and intraFreqReselection. Parameter cellBarred may be set to barred/notBarred. The value barred means that the cell is barred and the value notBarred means that the cell is not barred. Parameter intraFreqReselection indicates allowance of cell selection or reselection to the intra-frequency cells. That is Parameter intraFreqReselection controls cell selection/reselection to intra-frequency cells when the highest ranked cell is barred, or treated as barred by the UE. Parameter intraFreqReselection may be set to allowed/notAllowed. The value allowed means that cell selection or reselection to intra-frequency cells is allowed and the value notAllowed means that cell selection or reselection to intra-frequency cells is not allowed.

According to the embodiment of the disclosure, cell barring may be performed efficiently, so that reduce unnecessary delay of the cell selection or reselection.

Random Access Resource selection for transmitting Msg1 on licensed spectrum has the following operations:

Operation 1: Synchronization Signal Block (SSB) Selection
  CBRA: MAC entity selects a suitable SSB where an SSB is suitable if SS-RSRP of that SSB is above rsrp-ThresholdSSB. Selection of a suitable SSB amongst multiple suitable SSBs is up to UE implementation. If a suitable SSB is not available, MAC entity can select any SSB.
  CFRA: MAC entity selects a suitable SSB amongst the SSBs for which CF resource are configured.

Operation 2: PRACH Preamble Selection
  CBRA: First MAC entity selects preamble group A or group B based on Msg3 size and/or path loss. MAC entity then selects a Random Access Preamble randomly with equal probability from the Random Access Preambles associated with the selected SSB and the selected Random Access Preambles group.
  CFRA: MAC entity selects Random Access Preamble corresponding to selected SSB from the configured CF Random Access Preambles.

Operation 3: PRACH Occasion Selection
  CBRA: MAC entity selects the next available PRACH occasion from the PRACH occasions corresponding to the selected SSB. If there are several consecutive PRACH occasions corresponding to selected SSB, MAC entity selects a PRACH occasion randomly with equal probability amongst these PRACH occasions.
  CFRA: MAC entity selects the next available PRACH occasion from the PRACH occasions corresponding to the selected SSB permitted by the restrictions given by the ra-ssb-OccasionMaskIndex. If there are several consecutive PRACH occasions corresponding to selected SSB, MAC entity selects a PRACH occasion randomly with equal probability amongst these PRACH occasions.

In an embodiment, MAC Entity may select one or multiple PRACH Occasions.

In licensed spectrum, MAC entity selects one physical random access channel (PRACH) occasion and informs the same to PHY. Msg1 is transmitted in that PRACH occasion by PHY.

In unlicensed spectrum, it is assumed that MAC entity selects Random Access Resource (i.e. Random Access Preamble, PRACH occasion) and informs the same to PHY. PHY performs LBT check. PHY transmits Msg1 in PRACH occasion if LBT success criteria is met and informs the MAC that Msg1 is transmitted. PHY does not transmit Msg1 in PRACH occasion if LBT success criteria is not met and informs the MAC that Msg1 is not transmitted or can send power ramping suspension notification.

Figure 10:
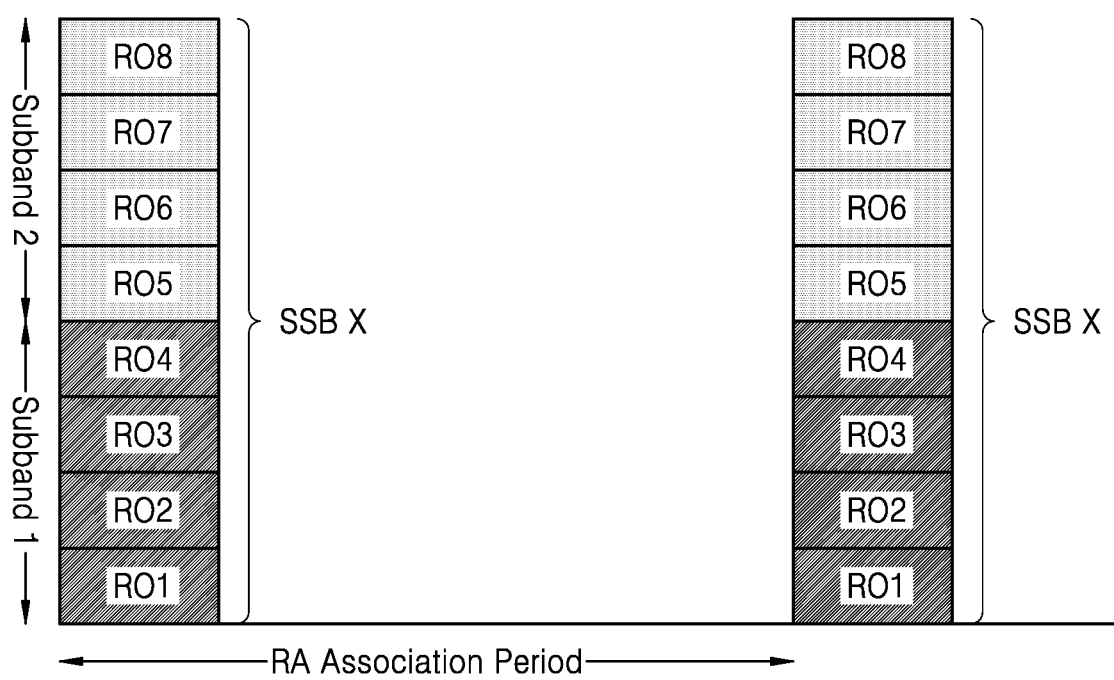
FIG. 10 illustrates a random access resource selection method in NR-U according to an embodiment of the disclosure.

FIG. 10 illustrates a random access resource selection method in NR-U according to an embodiment of the disclosure.

Figure 11:
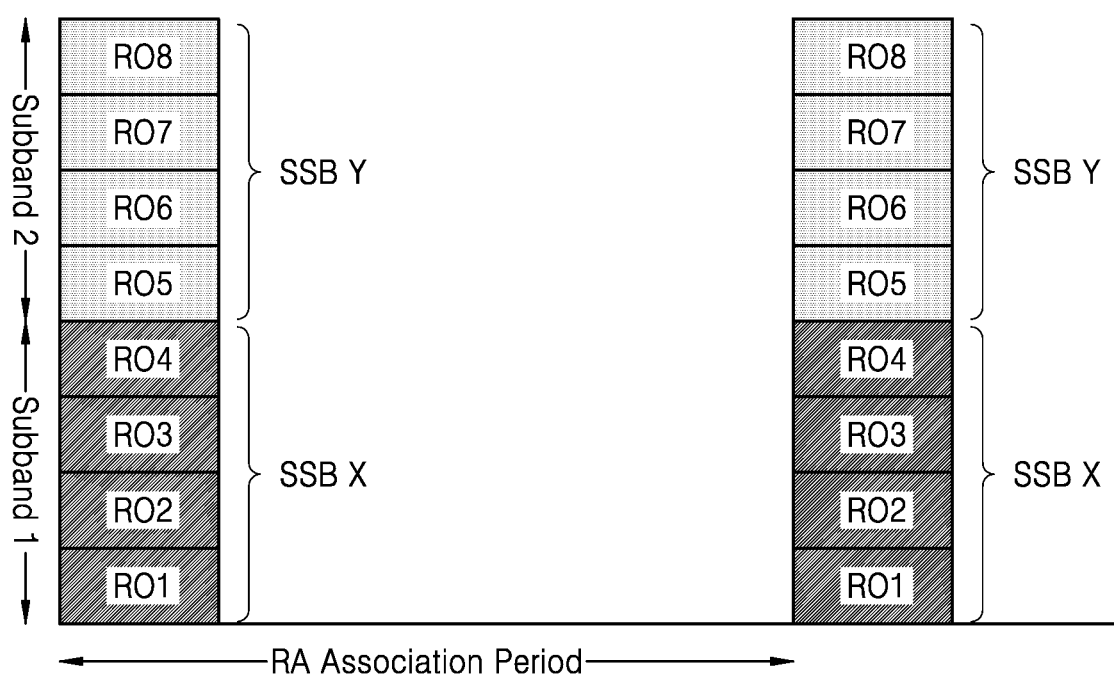
FIG. 11 illustrates another random access resource selection method in NR-U according to an embodiment of the disclosure.

FIG. 11 illustrates another random access resource selection method in NR-U according to an embodiment of the disclosure.

Referring to FIGS. 10 and 11, in unlicensed spectrum, selecting and informing only one PRACH occasion to PHY may delay the Msg1 transmission as explained below.

Selection of multiple PRACH occasions corresponding to a selected SSB: In unlicensed spectrum multiple PRACH occasions across multiple LBT sub-bands can be configured to mitigate UL LBT failures. Referring to FIG. 10, 8 FDMed PRACH occasions are configured wherein RO1 to RO4 are in sub-band 1 and RO5 to RO8 are in sub-band 2. Let's say MAC entity has selected an SSB X and all these PRACH occasions are mapped to SSB X. According to current procedure MAC entity randomly selects one PRACH occasion from RO1 to RO8. If selected PRACH occasion belongs to sub-band 1 and LBT is not successful in sub-band 1, PHY cannot transmit Msg1 in current association period even if LBT can be successful in sub-band 2.

according to an embodiment of the disclosure, to overcome this issue, MAC entity selects one PRACH occasion corresponding to a selected SSB from each of sub-band 1 and sub-band 2 (SSB X and SSB Y, respectively) and inform the PHY about the same. PHY performs LBT check for sub-band 1 and sub-band 2 in parallel and transmit the Msg1 in sub-band where LBT is successful.

according to an embodiment of the disclosure, if the FDMed PRACH occasions corresponding to selected SSB span multiple LBT sub-bands, MAC entity randomly selects one PRACH occasion among these FDMed PRACH occasions from each of these LBT sub-bands and inform the same to PHY. PHY performs LBT check for each of these LBT sub-bands parallel and transmit the Msg1 in sub-band where LBT is successful.

Figure 12:
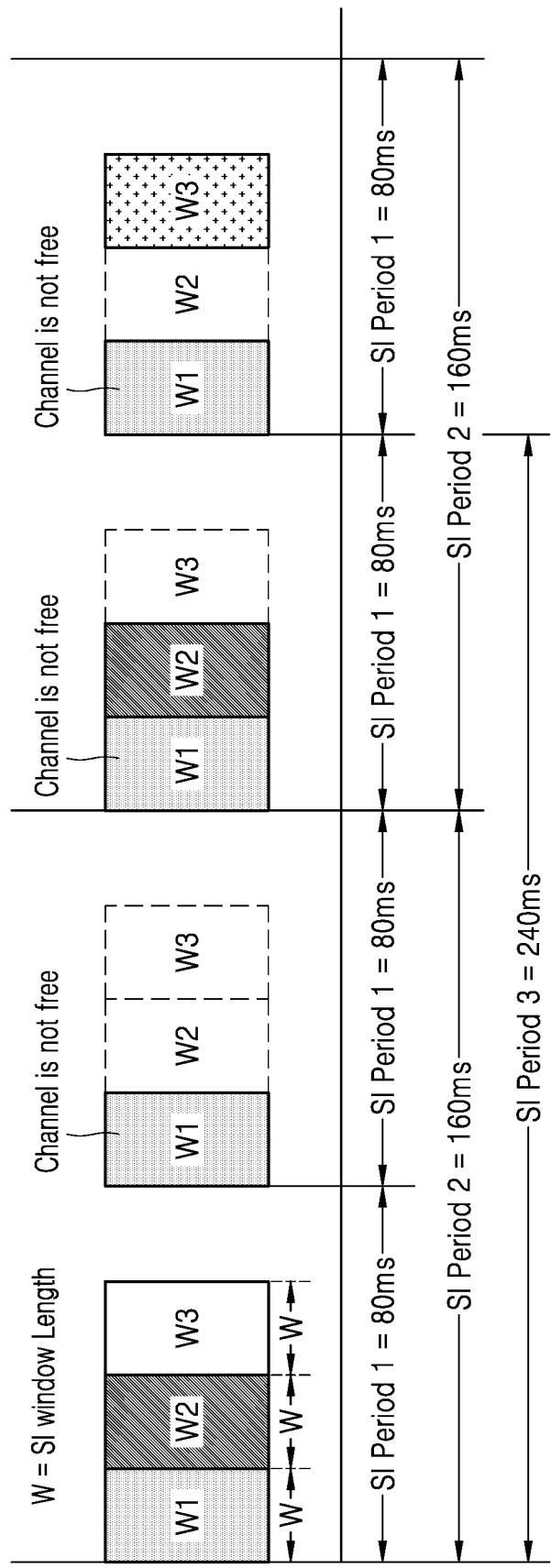
FIG. 12 illustrates another random access resource selection method in NR-U according to an embodiment of the disclosure.
Figure 13:
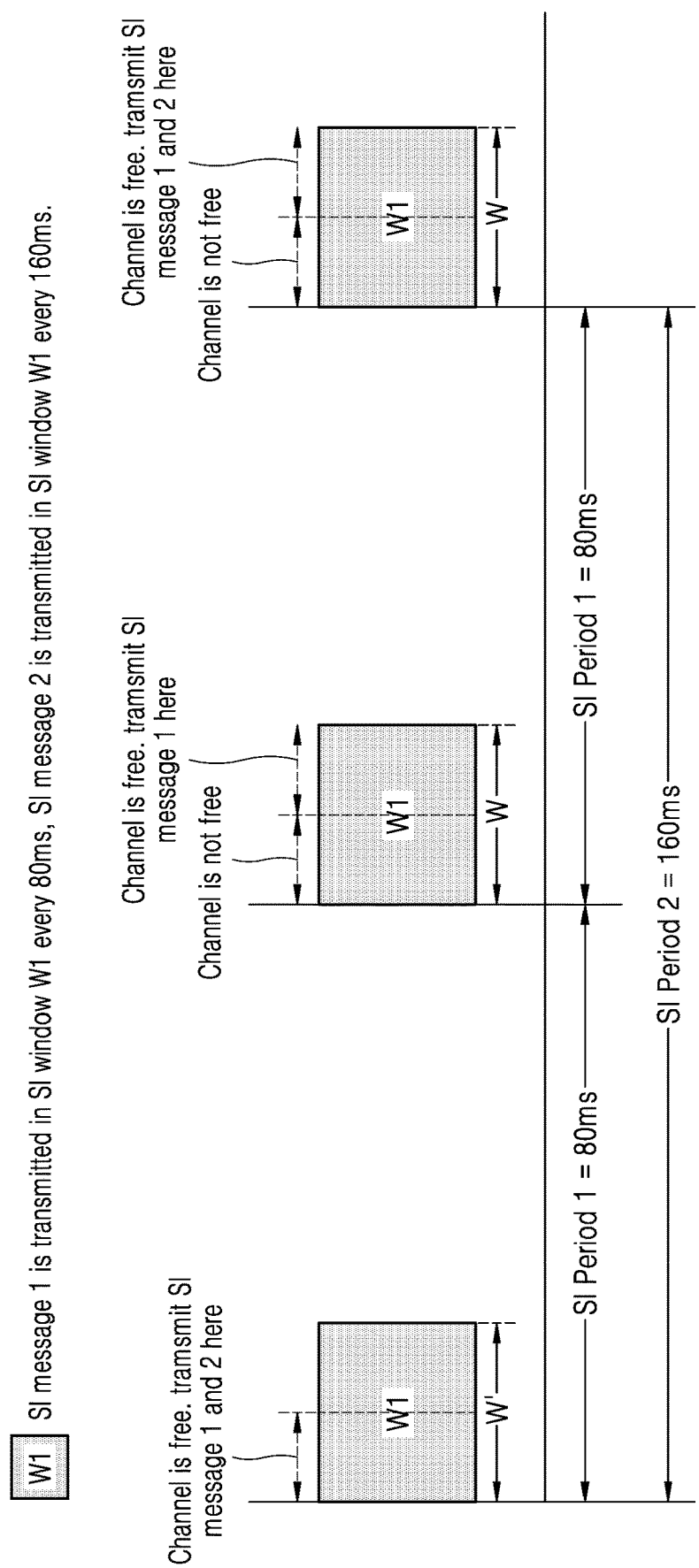
FIG. 13 illustrates another random access resource selection method in NR-U according to an embodiment of the disclosure.

FIGS. 12 and 13 illustrate another random access resource selection method in NR-U according to various embodiments of the disclosure.

Referring to FIGS. 12 and 13, in NR, a cluster of SI-Windows (each of equal length) occurs periodically (at smallest SI period amongst all the SI periods). Referring to FIG. 12, for a cell transmitting 3 SI messages (schedulingInfoList in si-SchedulingInfo in SIB1 includes a list of 3 SI messages) wherein SI message 1 has SI periodicity of 80 ms, SI message 2 has SI periodicity of 160 ms and SI message 3 has periodicity of 240 ms. SI periodicity of each SI message is explicitly signaled in si-SchedulingInfo. si-WindowLength is common for all SI messages and is signaled in si-SchedulingInfo. For an SI message, SI window number is the order of entry in the list of SI messages configured by schedulingInfoList in si-SchedulingInfo in SIB1. SI message 1 in schedulingInfoList is mapped to SI window number 1. SI message 2 in schedulingInfoList is mapped to SI window number 2 and SI message 3 in schedulingInfoList is mapped to SI window number 3. SI window for a SI message starts at the slot #a, where a=x mod N, in the radio frame for which SFN mod T=FLOOR(x/N), where T is the si-Periodicity of the SI message and N is the number of slots in a radio frame and x=(n−1)*w, where w is the si-WindowLength and n is the SI window number.

In case of unlicensed spectrum, gNB needs to determine whether the channel is free or not for DL-SCH transmission. If channel is not free in SI-window occasion of a SI message, gNB cannot transmit SI message in SI-window. For example as shown in FIG. 12, if channel is not free in W1, gNB cannot transmit SI message 1.

The mapping between SI messages and SI-windows is being enhanced to provide additional flexibility in transmitting the SI messages in SI-windows. SI window of larger size can be configured and multiple SI messages can be mapped to an SI-window. FIG. 13 is an example illustration of this approach. Referring to FIG. 13, SI message 1 and SI message 2 is mapped to a same SI-Window. The periodicity of SI message 1 and SI message 2 are 80 ms and 160 ms respectively. The SI-window is configured large enough to allow multiple transmission opportunities. When the channel is available, either or both SI messages can be transmitted in SI-window depending on SI periodicities of these SI messages. SI window of larger size and mapped to multiple SI messages is more flexible in handling the channel availability then having multiple small sized SI windows mapped to one SI message.

In existing system wherein each SI message is mapped to distinct SI window, for an SI message, SI window number is the order of entry in the list of SI messages configured by schedulingInfoList in si-SchedulingInfo in SIB1. SI message 1 in schedulingInfoList is mapped to SI window number 1. SI message 2 in schedulingInfoList is mapped to SI window number 2 and SI message 3 in schedulingInfoList is mapped to SI window number 3. If multiple SI messages can be mapped to same SI window, issue is how UE knows which SI message is mapped to which SI window.

In one method, SIB1 can indicate number of SI windows (numSIWindows). The $x^{th}$ SI message in schedulingInfoList is mapped to SI window number given by 'x mod (numSIWindows+1)' or '(x−1) mod numSIWindows', x=1, 2, ... Number of SI messages in schedulingInfoList.

In another method, SIB1 can indicate number of SI messages mapped to one SI window (numSIMessagesPerSiWindow). SI messages 1 to numSIMessagesPerSiWindow are mapped to SI window number 1. SI messages numSIMessagesPerSiWindow+1 to 2*numSIMessagesPerSiWindow are mapped to SI window number 2. SI messages 2*numSIMessagesPerSiWindow+1 to 3*numSIMessagesPerSiWindow are mapped to SI window number 3 and so on.

Figure 14:
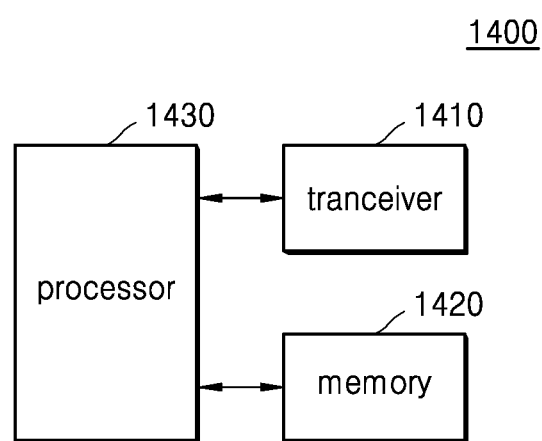
FIG. 14 is a block diagram illustrating a UE according to an embodiment of the disclosure.

FIG. 14 is a block diagram illustrating a UE according to an embodiment of the disclosure.

Referring to FIG. 14, the device 1400 may include a transceiver 1410, a memory 1420 and a processor 1430, However, all of the illustrated components are not essential. The device 1400 may be implemented by more or less components than those illustrated in FIG. 14. In addition, the transceiver 1410, the memory 1420 and the processor 1430 may be implemented as a single chip according to another embodiment. Furthermore, the transceiver 1410, the memory 1420, and/or the processor 1430 may include at least one transceiver, at least one memory and/or at least one processor, respectively.

The aforementioned components will now be described in detail.

The transceiver 1410 may include a RF transmitter for up-converting and amplifying a transmitted signal, and a RF receiver for down-converting a frequency of a received signal. However, according to another embodiment of the disclosure, the transceiver 1410 may be implemented by more or less components than those illustrated in components.

The transceiver 1410 may be connected to the processor 1430 and transmit and/or receive a signal. The signal may include control information and data. In addition, the transceiver 1410 may receive the signal through a wireless channel and output the signal to the processor 1430. The transceiver 1410 may transmit a signal output from the processor 1430 through the wireless channel.

The memory 1420 may store the control information or the data included in a signal obtained by the device 1400. The memory 1420 may be connected to the processor 1430 and store at least one instruction or a protocol or a parameter for the proposed function, process, and/or method. The memory 1420 may include read-only memory (ROM) and/or random access memory (RAM) and/or hard disk and/or CD-ROM and/or DVD and/or other storage devices.

The processor 1430 may control the proposed function, process, and/or method. Operation of the device 1400 may be implemented by the processor 1430.

In an embodiment of the disclosure, the processor 1430 may determine whether system information block type 1 (SIB1) is acquired from a cell, consider the cell as barred, if the acquiring the SIB1 fails, determine whether the cell is a licensed cell or an unlicensed cell and exclude the cell and other cells on a same frequency with the cell as a candidate for cell selection or reselection for a pre-defined period, if the cell is a licensed cell and cell selection or reselection to intra-frequency cells is not allowed.

In an embodiment of the disclosure, the processor 1430 may determining whether the a barred cell is a licensed cell or an unlicensed cell, determining whether the barred cell belongs to a PLMN equivalent to a registered PLMN and excluding cells on a same frequency with the cell as a candidate for cell selection or reselection for a pre-defined period, if cell selection or reselection to the intra-frequency cells is not allowed, the cell is unlicensed cell and the cell belongs to a PLMN equivalent to a registered PLMN.

Figure 15:
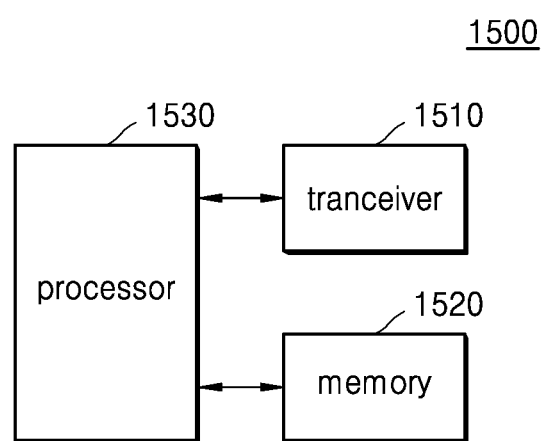
FIG. 15 is a block diagram illustrating a BASE STATION (BS) according to an embodiment of the disclosure.

FIG. 15 is a block diagram illustrating a BASE STATION according to an embodiment of the disclosure.

Referring to FIG. 15, the device 1500 may include a transceiver 1510, a memory 1520 and a processor 1530, However, all of the illustrated components are not essential. The device 1500 may be implemented by more or less components than those illustrated in FIG. 15. In addition, the transceiver 1510, the memory 1520 and the processor 1530 may be implemented as a single chip according to another embodiment. Furthermore, the transceiver 1510, the memory 1520, and/or the processor 1530 may include at least one transceiver, at least one memory and/or at least one processor, respectively.

The aforementioned components will now be described in detail.

The transceiver 1510 may include a RF transmitter for up-converting and amplifying a transmitted signal, and a RF receiver for down-converting a freqbase stationncy of a received signal. However, according to another embodiment of the disclosure, the transceiver 1510 may be implemented by more or less components than those illustrated in components. Furthermore, the transceiver 1510, the memory 1520, and/or the processor 1530 may include at least one transceiver, at least one memory and/or at least one processor, respectively.

The transceiver 1510 may be connected to the processor 1530 and transmit and/or receive a signal. The signal may include control information and data. In addition, the transceiver 1510 may receive the signal through a wireless channel and output the signal to the processor 1530. The transceiver 1510 may transmit a signal output from the processor 1530 through the wireless channel.

The memory 1520 may store the control information or the data included in a signal obtained by the device 1500. The memory 1520 may be connected to the processor 1530 and store at least one instruction or a protocol or a parameter for the proposed function, process, and/or method. The memory 1520 may include read-only memory (ROM) and/or random access memory (RAM) and/or hard disk and/or CD-ROM and/or DVD and/or other storage devices.

The processor 1530 may control the proposed function, process, and/or method. Operation of the device 1500 may be implemented by the processor 1530.

Methods according to the claims of the disclosure or the various embodiments of the disclosure described in the specification may be implemented in hardware, software, or a combination of hardware and software.

When implemented in software, a non-transitory computer-readable storage medium storing one or more programs (software modules) may be provided. One or more programs stored in the non-transitory computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   acquiring, from a cell, a synchronization signal block (SSB);
   selecting a physical random access channel (PRACH) preamble based on the SSB;
   selecting at least one PRACH occasion (PO); and
   transmitting, to the cell, a message 1 (msg1) in the selected at least one PO;

wherein in case that the cell is unlicensed, the selecting of the at least one PO comprises selecting a plurality of POs corresponding to the acquired SSB.

2. The method of claim 1, wherein the selecting of the at least one PO comprising:
   selecting the at least one PO corresponding to each of a sub-band related to the acquired SSB.

3. The method of claim 1, further comprising:
   identifying that listen-before-talk (LBT) criteria is satisfied; and
   transmitting the msg1 based on a result of identifying.

4. The method of claim 3, wherein the plurality of POs are configured across a plurality of LBT sub-bands.

5. The method of claim 4, wherein the identifying that the LBT criteria is satisfied comprises:
   identifying that the LBT criteria is satisfied for each of the plurality of the LBT sub-bands.

6. A user equipment (UE) in a wireless communication system, the UE comprising:
   a transceiver; and
   at least one processor configured to:
      acquire, from a cell, a synchronization signal block (SSB),
      select a physical random access channel (PRACH) preamble based on the SSB,
      select at least one PRACH occasion (PO), and
      control the transceiver to transmit, to the cell, a message 1 (msg1) in the selected at least one PO,
   wherein in case that the cell is unlicensed, the selection of the at least one PO comprises selection of a plurality of POs corresponding to the acquired SSB.

7. The UE of claim 6, wherein the at least one processor is further configured to select the at least one PO corresponding to each of a sub-band related to the acquired SSB.

8. The UE of claim 6, wherein the at least one processor is further configured to:
   identify that listen-before-talk (LBT) criteria is satisfied; and
   control the transceiver to transmit the msg1 based on a result of identifying.

9. The UE of claim 8, wherein the plurality of POs are configured across a plurality of LBT sub-bands.

10. The UE of claim 9, wherein the at least one processor is further configured to:
    identify that the LBT criteria is satisfied for each of the plurality of the LBT sub-bands.

* * * * *